Patented Aug. 25, 1953

2,650,173

UNITED STATES PATENT OFFICE 2,650,173

METHOD FOR DECREASING THE POROSITY OF CALCAREOUS AND SILICEOUS MATERIALS

Charles Edwin Goulding, Jr., Caracas, Venezuela

No Drawing. Application July 9, 1951, Serial No. 235,897. In Venezuela May 3, 1951

3 Claims. (Cl. 117—118)

This invention relates to a method and composition for treatment of porous rigid materials containing a polyvalent metal compound in form to undergo ion exchange reactions. The invention is particularly useful in connection with the treatment of cast Portland cement, concrete, plaster, unglazed brick and clay, and stone. The invention will, therefore, be illustrated by description in connection with such use.

In all of these materials there is the problem of porosity. It is difficult, for instance, to paint over the surfaces of concrete, unglazed clay tile, or the like because of the tendency of paint applied in normal amounts to penetrate below the surface and also because water penetrating a paint film and reacting chemically gives alkaline surfaces that cause the paint to flake off.

The polyvalent metal compounds subject to ion exchange reactions include calcium compounds in the Portland cement, concrete and plaster and also in many common building stones and iron and aluminum compounds in limited proportion or of limited solubility in brick and clay and in certain stones.

The present invention provides in its first step for decreasing the porosity of such materials to be treated and then, in a later step, increasing the volume and also hardening of the pore filling material formed in the first step of the invention.

Briefly stated, the invention comprises forming a plastic, gummy product, herein referred to as a "gel," within the pores of the material to be treated and then hardening the gel, the hardening being accompanied by increase in volume or swelling which forces the gel into even the minute capillaries and voids in the material being treated. More specifically, the invention comprises the application to the porous material of a solution of a water soluble metal salt of an organic acid and preferably of a higher fatty acid, causing this applied solution to remain in contact with the material to be treated until reaction occurs with the formation of gel with the ion exchangeable material being treated and within the pores thereof, and then applying to this gel a hardening and swelling agent including an aqueous solution of a salt of a polyvalent metal. The invention will be illustrated by the use of fatty acid salts.

The effect of this treatment is first, penetration of the aqueous solution of the fatty acid salt within the Portland cement or other porous material selected, then a slow reaction of this salt forming a gelatinous mass within the pores of the material, next the reaction of the polyvalent metal salt with unreacted portions of the salt of the fatty acid or other components of the gel and said porous material, to increase the volume of the mass and force it by the pressure thus generated into the minute spaces of the said material, and finally hardening the gelatinous mass. A fourth step is caused eventually to occur, this being drying of the resulting product, as by exposure to the atmosphere, the application of hot air, or other means for accelerating the rate of drying.

The soluble salt first applied is that of a fatty acid with a metal, ordinarily an alkali metal. Examples of such metals that I have used are lithium, sodium, potassium, and ammonium. The potassium salts of even the higher fatty acids are relatively soluble in water and for that reason are preferred. In use of the other alkali metals I find for most purposes no advantage which offsets the extra cost or other difficulties such as decreased solubility of the salts in water or instability in aqueous compositions. I have also used to advantage mixtures of these alkali metals, as, for instance, a mixture of the potassium and lithium salts of the selected acid, or the lithium and sodium salts. Under special circumstances, however, I prefer to use one of the metals whose salt with the selected acid is less soluble than the potassium salt. When I wish to apply the salt as a paste buttered or trowelled onto a porous surface, for example, I frequently use either the ammonium or sodium salt or both. With these less soluble metal salts, I am able to make a paste without the use of a relatively high concentration of solution. With ammonium salts, there is another advantage under some circumstances; when the composition is exposed to air, the ammonia escapes slowly and leaves ultimately a decreased concentration of by-product soluble salt at the surface of the material being treated.

As the organic acid represented in the salt of the alkali metal, I use any higher fatty acid, as, for instance, one containing 11 to 22 carbon atoms to the molecule. Examples of such acids that are used are lauric, palmitic, oleic, myristic, linoleic, and linolenic. For best results in the quality of the gelatinous material produced and finally hardened, I use also either a lower aliphatic acid or a cyclic organic acid or both along with the higher fatty acid. As the lower fatty acid I use any aliphatic acid within the range 6 to 8 carbon atoms to the molecule; examples of these are caproic and caprylic acid. As the cyclic acid, I may use such an acid as naphthenic, phenylpropionic, or any one of the phthalic acids. The acid selected may be natural or synthetic, the natural being derived suitably from vegetable or animal oils and fats and the synthetic from petroleum products as the starting material.

In the polyvalent metal salt used as the hardening and swelling agent, I use a metal or a mixture of metals of valence 2 or more. Metals that are particularly satisfactory in this salt are aluminum, calcium, copper, chromium, and iron. Aluminum is satisfactory for all usual purposes, inexpensive in the form of suitable salts, and, therefore, the metal which is selected ordinarily unless color is desirable. In the latter event, I select one of the polyvalent metals such as copper, chromium or iron or combinations of them which give colored reaction products with the gel formed in the first step of my treatment and also with the ion exchangeable material being treated.

As the acid represented in the salt of the polyvalent metal, I use preferably an inorganic acid as, for example, sulfuric, hydrochloric, hydrobromic, or nitric acid, the acid selected being non-oxidizing under the conditions of use. Nitric acid is not satisfactory under all conditions because it may have an oxidizing effect upon some of the organic acids used, particularly when an unsaturated organic acid is present and the treated material is exposed at some stage to elevated temperatures. Sulfuric acid is satisfactory for all purposes and is the acid which is normally used. In fact, I find aluminum sulfate to be very desirable as the salt for the hardening or swelling action, because of the lack of objectionable side reactions with aluminum sulfate and because of the low cost of it.

As the liquid medium for application of the salt of the fatty acid to the porous material to be treated, I ordinarily use water. When greater solubility or more rapid penetration of the salt of the organic acid is desired, then I mix the water with a water soluble organic solvent such as alcohol, acetone, propanol or morpholine in the proportion of about 10 to 50 parts of the solvent for 100 parts of the mixture of the water and solvent.

In another embodiment, I use as the liquid medium an aqueous emulsion of a water insoluble organic solvent for the salt of the organic acid. Thus I may use emulsions of water with gasoline, hexane or toluene. Suitable proportions are 10 to 20 parts of the insoluble organic solvent for 100 parts of the emulsion of it with water. A conventional emulsifying agent may be admixed.

When foam during the application is a problem an anti-foaming and penetration agent may be incorporated into the solution of the salt of the organic acid. Examples are ethanol, glycerine, propanol, and acetone. Suitable proportions are 0.5% to 1.5% of the weight of the solution of the said salt.

In any case the organic solvent in the liquid medium used should be volatile so that it will escape from the treated product on exposure to air.

As to proportions, the solution of the alkali metal salt of the organic acid is made of concentration to give the viscosity desired in the chosen method of application to the porous material to be treated. If good penetration is desired, as is usually the case, the concentration of the alkali metal salt is made relatively low, so as to give a solution that may be applied by brushing, spraying, or dipping. For this type of application, I use ordinarily 1 to 20 parts of the alkali metal salt to 100 of its solution in water or other liquid medium. When, on the other hand, the said salt is to be applied in paste form, as by trowelling or paste-brushing over the surface, then I use concentrations to give a buttery or pasty mass suitable for application by such means. For this latter purpose, the concentration may be so high as to make the product practically a moist solid, as, for instance 90% solids.

When water has been applied in advance to the material to be treated, as, for instance, by hosing a floor or a wall, then the water in the salt to be applied to the floor or the wall may be decreased below the amounts stated above.

As to the proportion of the organic acids of the several classes to the total of them in mixed fatty acids, there should be at least 50% of higher fatty acid and ordinarily 50% to 90% of such acid or mixture of higher fatty acids on the total weight of fatty acids.

As to the proportion of the aluminum salt or other swelling and hardening agent used, the amount should be at least approximately equivalent and preferably in moderate excess of the amount required stoichiometrically to react with the salt of the organic acid first introduced. In other words, if there are used 3 mols of the organic acid salt of an alkali metal, there should be used at least 1 mol of the inorganic salt of a trivalent metal or 1.5 mols of the inorganic salt of a bivalent metal.

As to the conditions of treatment, these with one exception may be varied widely, as indicated above. The exception is the need of a period of time, after the application of the solution of the alkali metal salt of the organic acid, for reaction of the salt with the material being treated, to form a gel, before the swelling and hardening agent is subsequently applied. This period of time required under any given set of circumstances is determined by simple test, as follows: The solution is applied to the surface of the material to be treated and the visible effect is observed, preferably with moderate magnification. When the solution applied has penetrated the material to be treated, when the formation of gelatinous mass in the pores can be seen to have occurred, and when the rate at which additional gelatinous material forms becomes so slow that no further substantial change is visible, then this period of time is to be taken as that required for this class of porous material with the particular salt of the organic acid selected. In other words, such a test on cast Portland cement, for example, with the potassium salt of the particular mixture of fatty acids, at the concentration of the solution, in the solvents and at the temperature to be used commercially shows the time of reaction in other cast Portland cement with the same treating solution under comparable conditions.

In actual commercial operation, I allow a safety factor above that when no further production of gelatinous material is visible. There is gradual progress of the reaction, so that even when the rate becomes so slow as to cause no further visible effect, there is a slow further change. This change is helpful in my treating process. For this reason, I allow ordinarily 24 hours or longer after the first application before the swelling and hardening agent is applied. In some cases, this time may be cut to as little as 1 hour or it may be extended to a week or so, the treatment at the shorter times failing to give the same uniformity and effectiveness of treatment below the surface that is obtained with the longer times of reaction of the first solution with the porous material before the second solution is applied.

In general, the time of reaction required with the first solution, that is, the organic acid salt, before the swelling and hardening agent is introduced will be less, the greater is the solubility in water of the porous material being treated. With a plaster block, for example, where the solubility of the calcium salt in water is appreciable, the time required for the reaction with the first solution is somewhat shorter than with concrete. With a fired clay tile of relatively low solubility, on the other hand, the rate of reaction is somewhat slower and the time required is longer.

With the more reactive material such as plaster, the use of volatile organic solvent in the aqueous medium used for the application serves a special purpose. The organic solvent, such as one of the soluble alcohols, acetone, or morpholine, not only decreases the viscosity of the solution of a potassium soap or the like and thus favors penetration, but also decreases the solubility of the plaster in the liquid medium. This combination of advantages promotes good penetration before gel formation occurs. For such maximum effect in this regard, the organic solvents may be used, either alone or mixed with each other, without any water at all. The cost of such treatment is not permissible, however, for most purposes.

The invention will be further illustrated by description in connection with the following specific examples of the practice of it.

*Example 1*

A concrete wall is sprayed with an aqueous solution containing 20% by weight of the potassium salts of the cocoanut oil fatty acids.

Then I wait 24 hours and then apply a 20% solution of aluminum sulfate in water. This latter solution is sprayed or brushed on, the solution being used in amount to provide 1 mol of the aluminum salt for 3 mols of the potassium salt first used. After that, the treated wall is allowed to dry.

*Example 2*

In treating a plaster of Paris statuette, I use the procedure of Example 1.

The treated statuette is then so low in porosity that it may be cleaned by washing with water without deterioration or it may be used as a pattern for casting purposes, without deteriorating in wet sand.

In a modification of this example the water in which the soap is introduced as the first step in the treatment is mixed with a 25% solution of ethyl alcohol or isopropyl alcohol on the weight of the water.

*Example 3*

In treating fired clay roofing tile, I impregnate the tile with a 10% solution of the potassium salt of the selected organic acid. As the solvent, I use water with 15% to 20% of ethyl alcohol and 1% to 1.5% of glycerine. When the roofing tile has already been laid on the roof, I apply the solution by flooding and then mopping around with a squeegee. I allow 24 hours for penetration and reaction to occur. Then I apply a water solution of aluminum sulfate, copper sulfate, copper chloride, iron chloride, or like salt of a polyvalent metal, in excess of the proportion chemically equivalent to the organic acid salt first used.

It is considered that the reaction of the salt of the organic acid, here as in the other examples, involves an ion exchange with metal components of the tile and particularly with one or more of the metals magnesium, aluminum, calcium and iron which occur in the porous material being treated.

*Example 4*

The procedure of any of the Examples 1–3 is followed except that the salt of the organic acid used is replaced by the potassium salt of a mixture of higher fatty acids in the $C_{11}$ to $C_{18}$ range and lower fatty acids in the range of $C_6$ to $C_8$, in the proportion of at least 50 parts by weight of the higher fatty acids to 100 parts by weight of he total fatty acids.

In a modification of this example, the potassium salts are replaced by other monovalent electropositive groups, as by one of the alkali metals such as sodium or lithium or by ammonium or by a mixture of such monovalent metals.

*Example 5*

The procedure of any of the Examples 1, 2, or 4 is followed and in addition there is used a small proportion of solution of a metal which in the treatment reacts to give a colored product. Thus there may be used chloride, sulfate, or nitrate of copper, ferrous, or ferric iron, chromium, manganese or the like.

When the metal compounds are used to produce color, they are applied after the treatment with the salt of the organic acid. These compounds are suitably incorporated with or as a substitute for the aluminum or like salt used to swell and harden the gel first formed within the porous material. When the aluminum is used with the coloring metal or metals, both or all of the polyvalent metals are used preferably in the form of salts with the same acid, as in the form of the sulfate or chloride of each or all of these metals.

*Example 6*

The procedure of any of the Examples 1, 2, 4, 5, and 6 is followed except that an organic liquid is mixed with the water used to dissolve the salt of the organic acid. Thus the water for this purpose is replaced by a solvent mixture containing about 10% to 30% of the organic liquid on the weight of the water. The organic liquid is alcohol, acetone, isopropyl alcohol, low boiling gasoline or hexane, these latter insoluble liquids being in emulsified form, or a mixture of two or more of these liquids.

*Example 7*

The procedure of any one of the Examples 1–6 is followed except that the organic acid, combined with potassium or the like in the salt first applied to the porous material, is one selected from the group consisting of naphthenic, phenylpropionic, orthophthalic acid or a mixture of oleic, palmitic, lauric, caprylic and caproic acids.

For the proper and adequate swelling and hardening of the gel first formed it is necessary that the solution of the polyvalent metal be applied before this gel has been dried.

Proportions here and elsewhere herein are expressed as parts by weight unless otherwise specifically stated to the contrary.

It will be understood also that it is intended to cover all changes and modifications of the examples of the invention herein chosen for the purpose of illustration which do not constitute departures from the spirit and scope of the invention.

What I claim is:

1. In decreasing the porosity of concrete, plaster, unglazed brick, clay tile, stone and like porous material containing a polyvalent metal compound in ion-exchangeable form, the method which comprises applying to the said material a solution of a water soluble alkali metal salt of a higher fatty acid containing 11-22 carbon atoms to the molecule, maintaining contact of the said salt with the said metal compound in ion exchangeable form until a gel is formed by interaction between the said compound and salt and within the pores of the material, then contacting the resulting gel before it is dried with an aqueous solution of a water soluble polyvalent metal salt, the said polyvalent metal salt reacting with the gel to swell and harden it and form an insoluble reaction product, and continuing the contact of the polyvalent metal salt with the said gel until additional insoluble reaction product no longer forms at a substantial rate.

2. The method of claim 1 in which the said solution of a water soluble alkali metal salt of a higher fatty acid containing 11-22 carbon atoms to the molecule contains also water soluble alkali metal salts of fatty acids containing 6 to 8 carbon atoms to the molecule in proportion that is substantial but less than the proportion of fatty acids containing 11-22 carbon atoms.

3. The method of claim 1 in which the said polyvalent metal salt is an inorganic aluminum salt.

CHARLES EDWIN GOULDING, Jr.

References Cited in the file of this patent

UNITED STATES PATENTS

| Number | Name | Date |
| --- | --- | --- |
| 1,460,251 | Kramer | June 26, 1923 |
| 2,154,220 | Sponsel | Apr. 11, 1939 |
| 2,599,590 | Sookne et al. | June 10, 1952 |
| 2,603,576 | Cook et al. | July 15, 1952 |

FOREIGN PATENTS

| Number | Country | Date |
| --- | --- | --- |
| 380,821 | Great Britain | Sept. 23, 1932 |
| 575,479 | Great Britain | Feb. 20, 1946 |